(12) United States Patent
Joshi et al.

(10) Patent No.: US 10,838,867 B2
(45) Date of Patent: Nov. 17, 2020

(54) SYSTEM AND METHOD FOR AMALGAMATING SERVER STORAGE CACHE MEMORY

(71) Applicant: DELL PRODUCTS, LP, Round Rock, TX (US)

(72) Inventors: Neeraj Joshi, Mudliarpet (IN); Lucky Pratap Khemani, Bangalore (IN); Shekar Babu Suryanarayana, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 395 days.

(21) Appl. No.: 15/484,708

(22) Filed: Apr. 11, 2017

(65) Prior Publication Data

US 2018/0293171 A1 Oct. 11, 2018

(51) Int. Cl.
*G06F 12/00* (2006.01)
*G06F 12/0842* (2016.01)
*G06F 12/0873* (2016.01)
*G06F 11/10* (2006.01)
*G06F 12/0846* (2016.01)

(52) U.S. Cl.
CPC ...... *G06F 12/0842* (2013.01); *G06F 11/1076* (2013.01); *G06F 12/0873* (2013.01); *G06F 12/0846* (2013.01); *G06F 2212/1016* (2013.01); *G06F 2212/1041* (2013.01); *G06F 2212/154* (2013.01); *G06F 2212/214* (2013.01); *G06F 2212/222* (2013.01); *G06F 2212/262* (2013.01); *G06F 2212/601* (2013.01); *G06F 2212/608* (2013.01)

(58) Field of Classification Search
CPC ............ G06F 12/0842; G06F 11/1076; G06F 12/0873; G06F 12/0846; G06F 2212/1016; G06F 2212/1041; G06F 2212/154; G06F 2212/214; G06F 2212/222; G06F 2212/262; G06F 2212/601; G06F 2212/608
See application file for complete search history.

(56) References Cited

U.S. PATENT DOCUMENTS

| | | | |
|---|---|---|---|
| 5,680,580 A | 10/1997 | Beardsley et al. | |
| 9,128,855 B1 | 9/2015 | Natanzon et al. | |
| 9,372,825 B1 | 6/2016 | Shee | |
| 2009/0210620 A1 | 8/2009 | Jibbe et al. | |
| 2011/0231602 A1 | 9/2011 | Woods et al. | |
| 2013/0232310 A1* | 9/2013 | Kruus | G06F 12/16 711/162 |
| 2014/0025890 A1* | 1/2014 | Bert | G06F 12/0842 711/118 |
| 2015/0261677 A1* | 9/2015 | Malewicki | G06F 12/0831 711/146 |
| 2018/0173442 A1* | 6/2018 | Kirkpatrick | G06F 3/064 |

* cited by examiner

*Primary Examiner* — Arvind Talukdar
(74) *Attorney, Agent, or Firm* — Larson Newman, LLP (57) ABSTRACT

A server rack may include a chassis management controller (CMC), a server having a baseboard management controller (BMC) configured to communicate with the CMC, a controller stored in the server rack for interoperating with a cache memory, and a set of solid state devices (SSDs) providing data storage. The CMC may amalgamate data storage provided by the SSDs and partition the amalgamated data storage into an individual logical cache for use with or by the BMC or controller.

18 Claims, 6 Drawing Sheets

SYSTEM AND METHOD FOR AMALGAMATING SERVER STORAGE CACHE MEMORY

FIELD OF THE DISCLOSURE

This disclosure generally relates to information handling systems, and more particularly relates to server rack systems, amalgamating server rack system storage cache memory device data storage and partitioning the amalgamated to provide individual caches for server rack component use.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Information handling systems may include multiple storage cache memory devices providing cache memory.

SUMMARY

A server rack may include a chassis management controller (CMC), a server having a baseboard management controller (BMC) configured to communicate with the CMC, a controller stored in the server rack for interoperating with a cache memory, and a set of solid state devices (SSDs) providing data storage. The CMC may amalgamate data storage provided by the SSDs and partition the amalgamated data storage into an individual logical cache for use with or by the BMC or controller.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
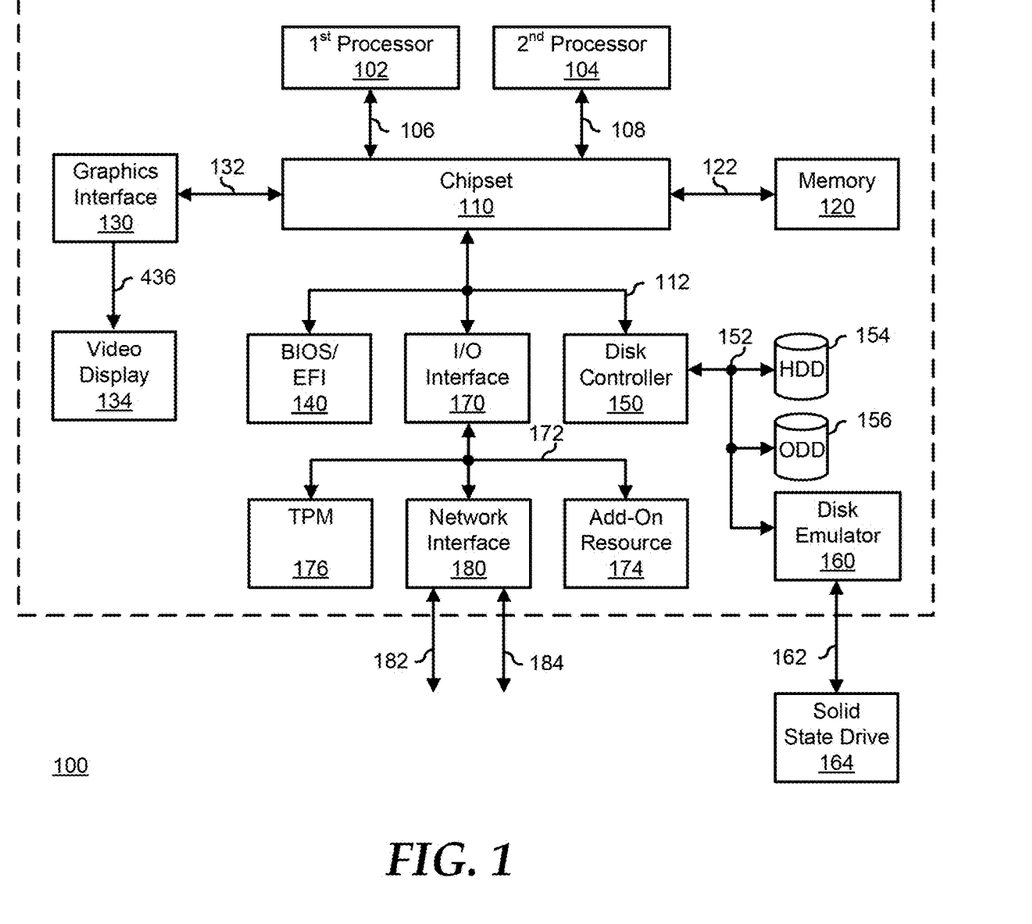
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a system of servers, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface

180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

An example of an information handling system is a server system of multiple servers stored and operating in a server rack. The server rack may itself be an information handling system providing configuration, monitoring and control of the servers and peripherals stored in the server rack. The server rack may thus provide a server rack system incorporating the server system and may be considered a server rack system. The server rack system may be considered an information handling system.

The server rack system may store a set of servers, each server having a baseboard management controller (BMC). A BMC is supported by the motherboard of a server and is a specialized service processor that monitors the physical state of the server using sensors and communicates with the server rack with a connection. The server rack may have a chassis management controller (CMC) which interfaces and communicates with the BMCs of the servers over one or more busses internal to the server rack. A CMC is a server rack controller supported by a motherboard of the server rack and is designed to manage servers stored in the server rack, as well as controlling components of the server rack. The server rack may store multiple peripherals, such as RAID or storage controllers and solid-state drives (SSDs) that may be modularly coupled to the server rack and which may interface with the CMC. A SSD may be considered a solid-state storage device that uses integrated circuit assemblies as memory to store data persistently and which generally has no mechanically moving parts for data storage.

A RAID or storage controller is a hardware device or software program used to manage SSDs in a computer or storage array so the SSDs operate as a logical unit. A BMC interacts with a RAID controller to monitor and manage a server storage system associated with the RAID controller, for example storage features such as RAID levels, number of physical disks, number of virtual disks, and other parameters. A RAID controller is associated with a BMC and the associated BMC monitors and manages the RAID controller storage system. BMCs and RAID controllers may be individually associated. One BMC may be associated with and thus is able to manage and monitor multiple RAID controllers.

The CMC may communicate with the peripherals over one or more busses internal to the server rack. More particularly, the server rack may have slots or ports connected to the busses and these slots or ports may be used for storing and operating peripheral devices, such as RAID controllers or SSDs positioned in the slots. The CMC may configure and control the peripherals. Each RAID or storage controller may be allocated a cache memory internal to the server rack. Similarly each BMC may be allocated a cache memory internal to the server rack. The CMC may communicate with the BMCs, and thus the stored servers, over one or more busses internal to the server rack.

The data storage provided by the SSDs stored in the server rack may be logically amalgamated into a logical cache memory and portions of this logically amalgamated cache memory may be allocated to RAID controllers and BMCs as needed to provided cache memory to the RAID controllers and BMCs. The cache memory allocated to the BMCs and RAID controllers may be dynamically adjusted from the logical amalgamation of cache memory as needed to provide cache memory of desired, chosen or adequate size to individual BMCs and RAID controllers. To further explicate: the SSDs stored in the server rack may be logically combined to form a logic data storage and portions of this combined SSD storage may be allocated, and expanded and contracted, with regard to the BMCs and RAID controllers of the server rack system to provide memory caches to the BMCs and RAID controllers. A cache memory allocation to a RAID controller or BMC may be expanded and contracted in response to IO performance.

The server rack CMC may have access to and maintain a database, which may be considered a cache allocation database, of the cache memory allocated to the BMCs and RAID controllers. the database may indicate a particular cache allocation and the portions of the SSDs forming the combined cache storage which form the cache allocation.

Figure 2:
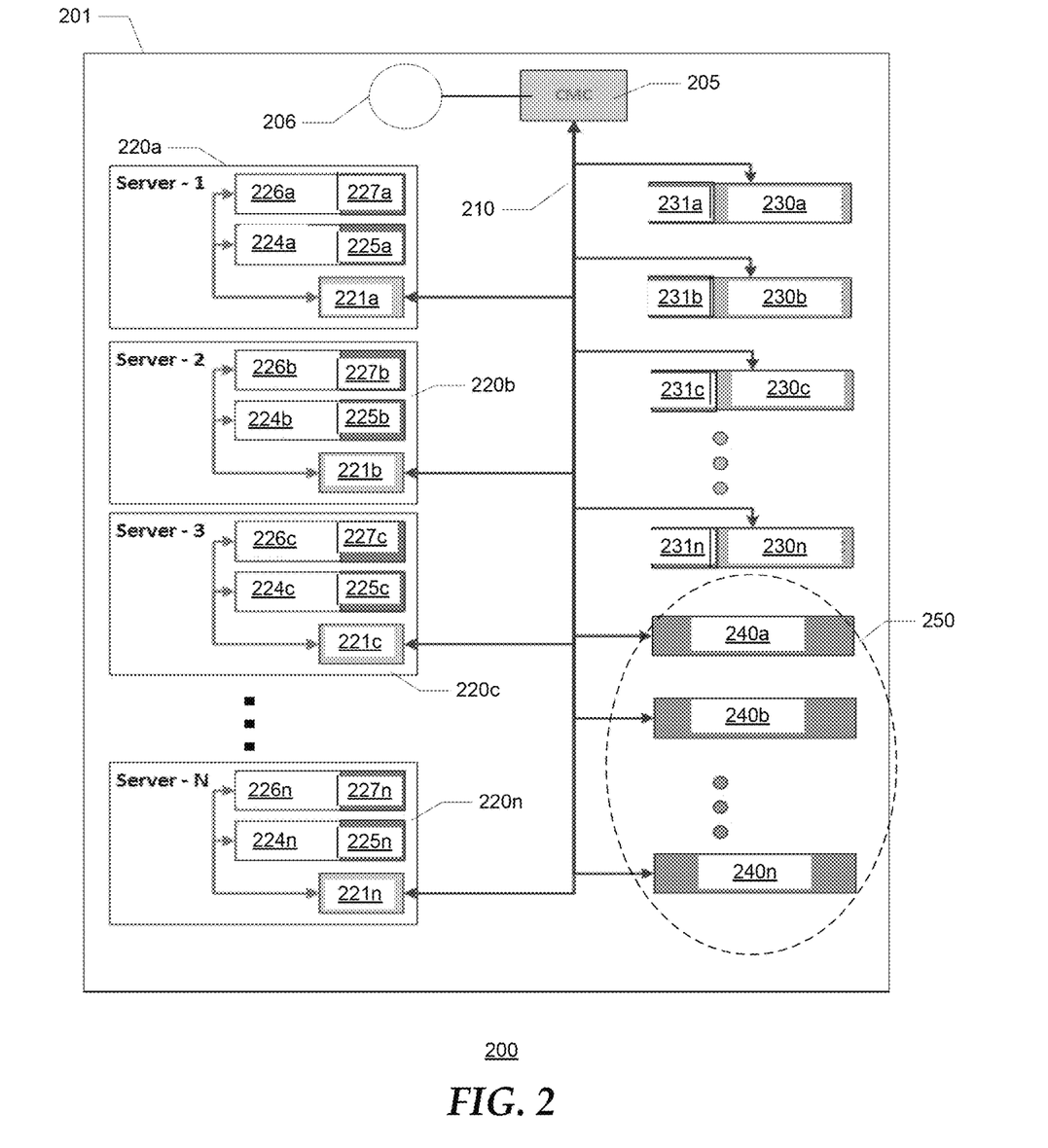
FIG. 2 illustrates an example server rack system according to an embodiment of the present disclosure.

FIG. 2 shows an example server rack system 200. Server rack system 200 includes server rack or server rack chassis 201 defining the physical footprint of server rack system 200. Server rack system 200 includes a CMC 205 connected to and having access to a CMC storage 206 which may support a cache allocation database. Server rack system 200 further includes a set of servers 220a-220n stored in server rack 201, a set of RAID controllers 230a-230n stored in server rack 201, and a set of SSDs 240a-240n stored in server rack 201. SSDs 240a-240n provide cache memory to server rack system 200. Servers 220a-220n, RAID controllers 230a-230n, SSDs 240a-240n, and CMC 205 are communicatively connected by internal server rack bus 210.

Servers 220a-220n, RAID controllers 230a-230n, and SSDs 240a-240n may communicate with each other and CMC 205 over internal server rack bus 210. While shown as a simple bus in FIG. 2, this is by way of explanation and bus 210 may comprise multiple bus structure, switches and connectors. Each server 220 includes a BMC 221 and internal RAID controllers 224 and 226. Each RAID controller 224 and 226 may have a corresponding local cache storage 225 and 227, respectively.

That is, servers 220a-220n include corresponding BMCs 221a-221n, corresponding internal RAID controllers 224a-224n, and corresponding internal RAID controllers 226a-226n. Each internal RAID controller 224a-224n has a corresponding local cache storage 225a-225n and each internal RAID controller 226a-226n has a corresponding local cache storage 227a-227n. Each of the BMCs 221a-221n is communicatively connected to server rack system RAID controllers 230a-230n, SSDs 240a-240n, and CMC 205 by internal server rack bus 210.

SSDs 240a-240n are logically amalgamated into a logical cache 250. That is, the data storage provided by SSDs 240a-240n is logically amalgamated into a logical cache 250 providing the data storage provided by SSDs 240a-240n. This logical cache 250 may then be logically partitioned and different logical partitions allocated to BMCs 221a-221n and RAID controllers 230a-230n for use as individual cache memory by said devices 221 and 230. The size of logical partitions allocated to BMCs 221a-221n and RAID controllers 230a-230n may be dynamically varied as needed to provide desired, needed or appropriate cache memory storage to individual devices 221 and 230.

CMC 205 may communicate with SSDs 240a-240n to logically amalgamate the data storage provide by SSDs 240a-240n into logical cache 250 and may form or partition logical cache 250 into multiple individual logical caches which may be allocated for use by individual BMCs 221a-221n and RAID controllers 230a-230n. CMC 205 may maintain descriptions of the individual logical caches partitioned from logical cache 250, for example, the descriptions of data storage portions of SSDs 240a-240n forming the individual logical caches, in a table or database in CMC storage 206.

CMC 205 may dynamically expand or contract the individual logical caches partitioned from logical cache 250 as needed to provide desired, needed or appropriate cache memory storage to individual devices 221 and 230. For example, if IO performance decreases, CMC 205 may dynamically expand an individual logical cache associated with the IO performance. CMC 205 may allocate additional memory portions of one or more SSDs to the individual logical cache to expand the logical cache. CMC 205 may then update an entry in a table or database in CMC storage 206 corresponding to the individual logical cache with additional memory portion(s) by indicating the SSD and SSD memory portions corresponding to the additional memory portion(s) allocated to the individual logical cache.

In embodiments, each RAID controller 230a-230n is associated with, for example, corresponds to, a respective individual logical cache allocated or partitioned from logical cache 250. These individual logical caches can be dynamically expanded or contracted as needed by the respective RAID controller 230 to provide cache memory to the respective associated RAID controller 230. An individual RAID controller 230 may be associated with one or more BMCs 221. The one or more BMCs 221 may interface with CMC 205 to expand or contract an individual logical cache associated with an individual RAID controller 230 to achieve a desired cache performance or capability. A RAID controller uses extended caches to increase server storage performance.

Figure 3:
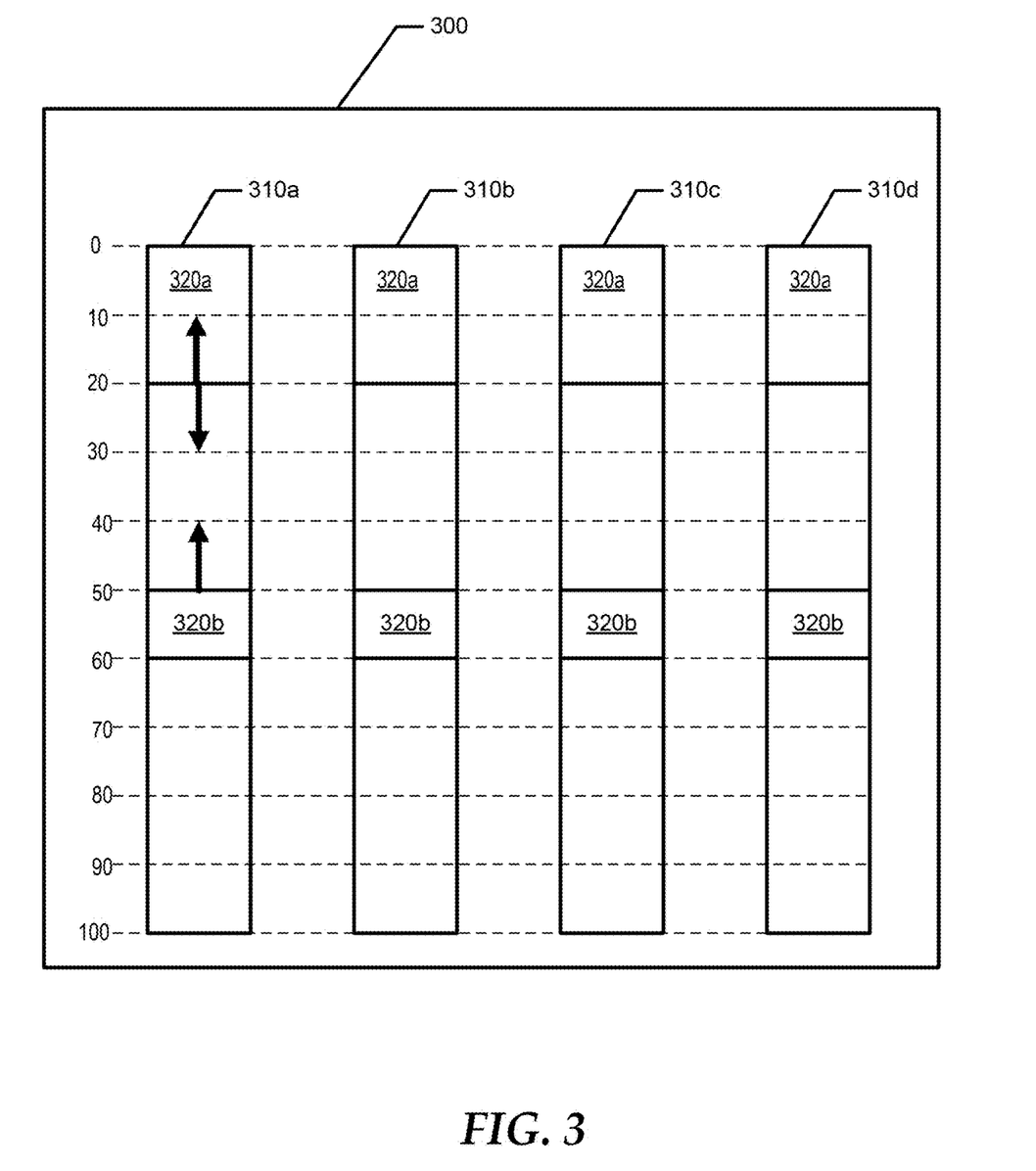
FIG. 3 illustrates an example amalgamated cache memory and partition of the same into individual caches according to an embodiment of the present disclosure.

FIG. 3 shows a logical cache 300 logically amalgamated from SSDs 310a-310d and the data storage provided by each of SSDs 310a-310d such that the data storage of logical cache 300 spans the data storage provided by each of SSDs 310a-310d. The amalgamated data storage of logical cache 300 may be partitioned into individual logical caches made up of portions of SSDs 310a-310d logically amalgamated into logical cache 300, for example individual logical partitions 320a and 320b. A table or database accessible by the server rack CMC may indicate the portions of SSDs 310a-310d forming individual logical caches 320a and 320b.

As can be seen from FIG. 3, individual logical cache 320a includes the memory spanned by addresses 0-20 of each of SSDs 310a-310d, and individual logical cache 320b includes the memory spanned by addresses 50-60 of each of SSDs 310a-310d. This is reflected in Table 1 (below) which may be maintained by the server rack CMC of the server rack storing SSDs 310a-310d to define individual logical caches:

TABLE 1

|  | SSD 310a | SSD 310b | SSD 310c | SSD 310d |
|---|---|---|---|---|
| cache 320a | 0-20 | 0-20 | 0-20 | 0-20 |
| cache 320b | 50-60 | 50-60 | 50-60 | 50-60 |

Each of individual logical caches 320a and 320b may be associated with and provide cache memory to a RAID controller. If individual logical caches 320a and 320b should provide more cache memory, for example, based on a degradation in IO performance, or because a higher allocation of cache memory is required, each of individual logical caches 320a and 320b may be expanded, that is, the memory allocated to individual logical caches 320a and 320b may be increased by allocating additional memory from the logical cache 300 logically amalgamated from SSDs 310a-310d to increase the size and memory provided by individual logical caches 320a and 320b. For example, as shown in FIG. 3, individual logical cache 320a can be expanded to additionally include addresses 20-30 of SSD 310a, and individual logical cache 320b can be expanded to additionally include addresses 40-50 of SSD 310a. This expanded data allocation to individual logical caches 320a and 320b is reflected in Table 2 (below) maintained by a server rack CMC:

TABLE 2

|  | SSD 310a | SSD 310b | SSD 310c | SSD 310d |
|---|---|---|---|---|
| cache 320a | 0-30 | 0-20 | 0-20 | 0-20 |
| cache 320b | 40-60 | 50-60 | 50-60 | 50-60 |

If cache memory is no longer required for an individual logical cache, then portions of the memory allocated to the individual logical cache may be de-allocated, and the size of the cache reduced. For example, as shown in FIG. 3, memory in SSD 310a allocated to individual logical cache 320a may be de-allocated such that the portion of SSD310a in individual logical cache 320a is reduced from 0-30 to 0-10, thereby deallocating the memory at addresses 10-30 of SSD 310a from individual logical cache 320a. This reduced data allocation to individual logical cache 320a is reflected in Table 3 (below) maintained by a server rack CMC:

TABLE 3

|  | SSD 310a | SSD 310b | SSD 310c | SSD 310d |
|---|---|---|---|---|
| cache 320a | 0-10 | 0-20 | 0-20 | 0-20 |
| cache 320b | 40-60 | 50-60 | 50-60 | 50-60 |

As can be seen from FIG. 3 and read from Tables 1-3, individual logical caches 320a and 320b are allocated different and non-overlapping portions of data storage of SSDs 310a-310b. Thus, in embodiments, individual logical caches are allocated different, and exclusive, for example non-overlapping, portions of the amalgamated data storage of logical cache 300. As would be understood by one of skill in the art, the memory allocations shown in FIG. 3 are by way of example, and individual logical caches may be partitioned form one or more SSDs and expanded (or deallocated) with regard to one or more SSDs. Individual logical caches 320a and 320b may be associated with, for example, used by or accessed by or managed by one or more BMCs or RAID or storage controllers, or by one or more pairs or groupings of BMCs and RAID controllers.

Figure 4:
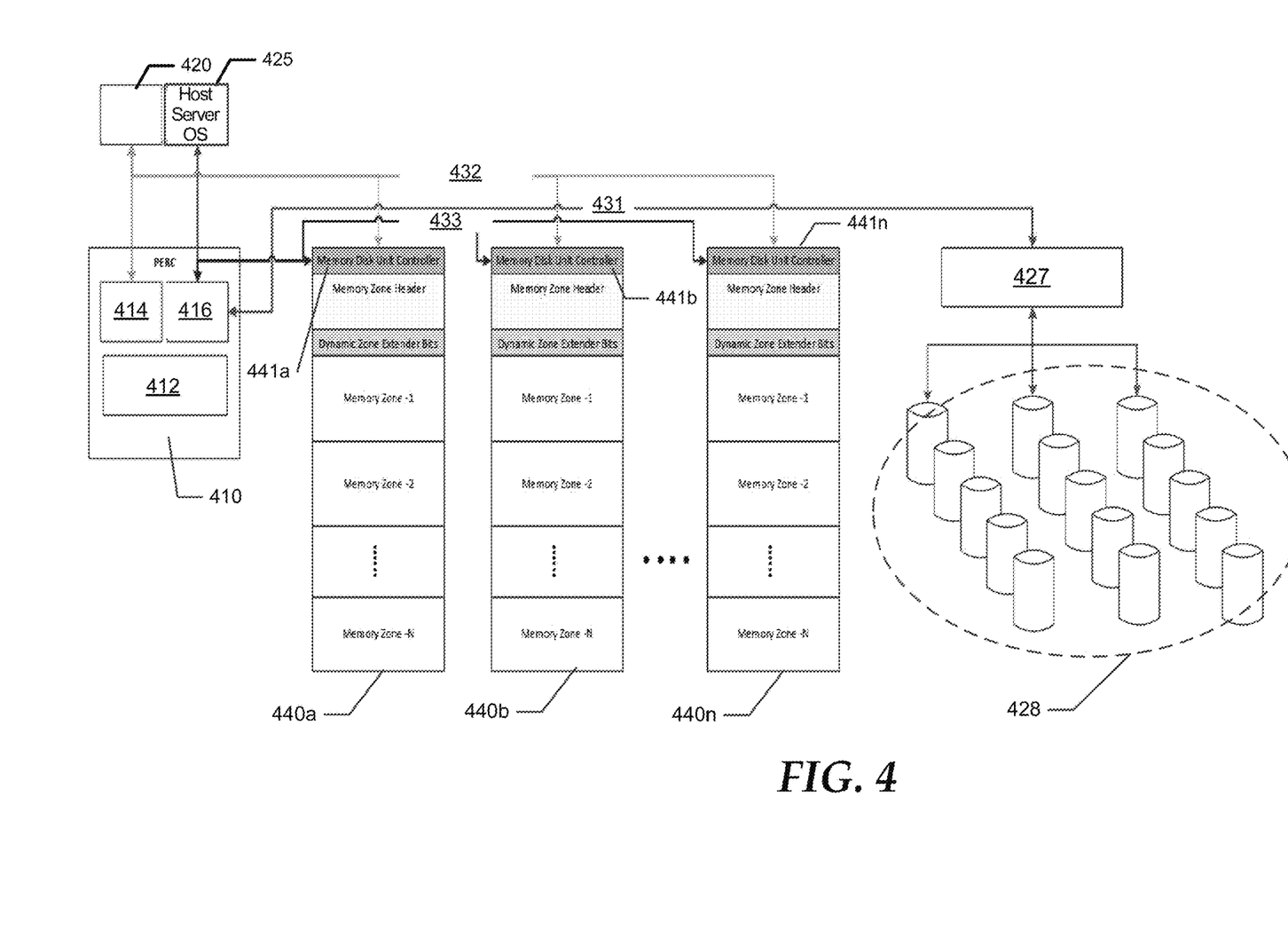
FIG. 4 illustrates an example server rack system according to an embodiment of the present disclosure.

FIG. 4 shows a server rack system portion 400 of a server rack system. Server rack system portion 400 includes RAID controller 410, a BMC 420 corresponding to a server of the server rack system, host server 425, and SSDs 440a-440n. RAID controller 410 includes internal cache 412, interface 414, and interface 416. RAID controller 410 accesses disk controller 427 to access storage disks 428 via interface 416 and bus 431. RAID controller 410 also interfaces with host server 425 via interface 416.

BMC 420 corresponds to RAID controller 410 and interfaces with RAID controller 410 over interface 414. Bus 432 may be used to configure an individual logical cache for RAID controller 410 in SSDs 440a-440n. SSDs 440a-440n each include a corresponding memory disk unit controller 441a-441n. Bus 433 is used by RAID controller 410 to do read/write to cache zones in SSDs 440a-440n. Cache zone will have zone headers and extender bits to dynamically increase/decrease of cache zone size based on the dynamic IO need, BMC 420 senses IO utilization and sets the extender bit to increase/decrease the cache size.

Figure 5:
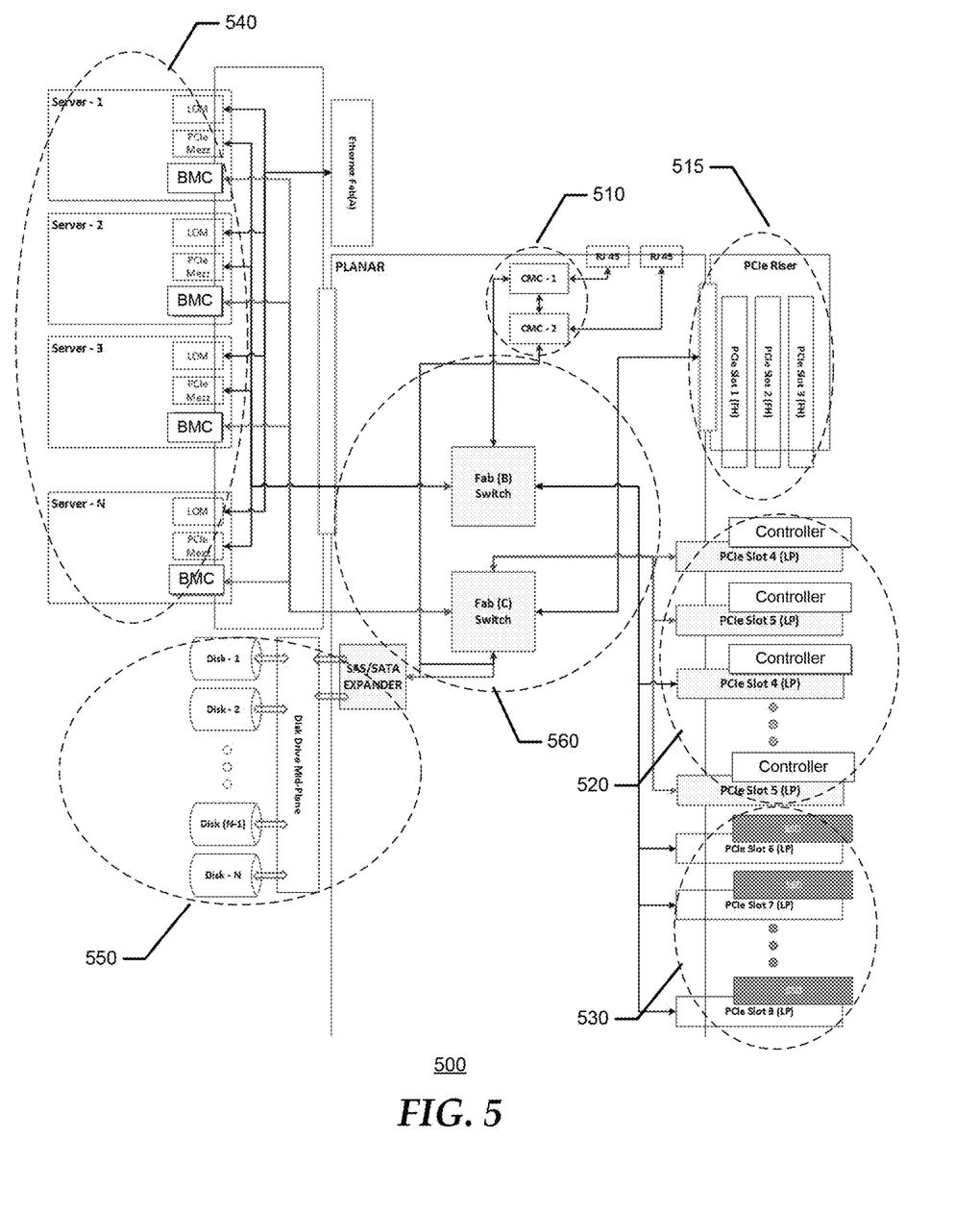
FIG. 5 illustrates an example server rack system according to an embodiment of the present disclosure.

FIG. 5 shows a detailed example of a server rack system 500. Server rack system 500 includes CMC 510 having two CMC cores as shown, a planar riser providing PCIe slots, a set of PCIe slots storing a set of controllers 520 which may be RAID or storage controllers, a set of PCIe slots storing SSDs 530, a set of servers 540 (including respective BMCs) stored in the server rack, and disk storage capacity 550. Peripheral Component Interconnect Express (PCIe or PCI-E) is a serial expansion bus standard for connecting a computer to one or more peripheral devices. Disk storage capacity 550 may involve SATA access. SATA, abbreviated from Serial AT Attachment, is a computer bus interface that connects host bus adapters to mass storage devices such as hard disk drives, optical drives, and solid-state drives. Server rack internal bus and switching circuitry 560 illustrating bus connections (not all shown) provides communication connectivity between CMC, BMCs, controllers and SSDs.

Figure 6:
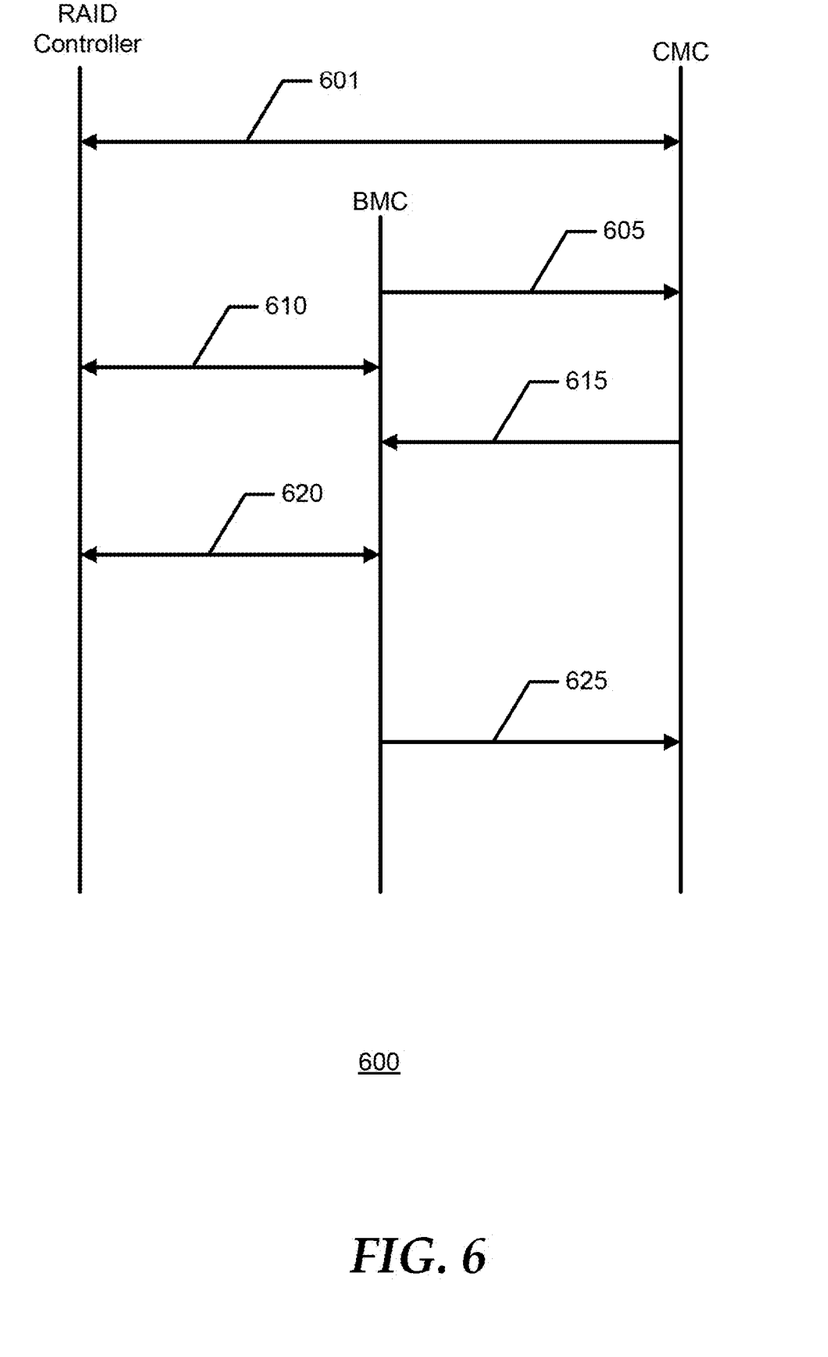
FIG. 6 illustrates example server rack system communications according to an embodiment of the present disclosure.

FIG. 6 shows an example of communications 600 among a CMC, BMC and RAID controller of a server rack system. At 601, the CMC accesses the RAID controller. The CMC and RAID controller may communicate. At 605, the BMC indicates to the CMC that the RAID controller configuration has changed. At 610, the BMC accesses the RAID controller. The BMC and RAID controller may communicate. At 615, the CMC requests RAID controller configuration information from the BMC. At 620, the BMC accesses the RAID controller. The BMC and RAID controller may communicate. At 625, the BMC provides RAID controller configuration information to the CMC.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A server rack system comprising:
a server rack including a chassis management controller (CMC);
a first server stored in the server rack and including a first baseboard management controller (BMC), the first BMC configured to communicate with the CMC;
a first controller stored in the server rack and configured to control a cache memory; and
a set of solid state devices (SSDs) stored in the server rack, wherein the CMC is configured to amalgamate data storage provided by SSDs of the set of SSDs and partition the amalgamated data storage into a first individual logical cache associated with the first controller, wherein during a first increase, the CMC is configured to provide an additional amount of data storage allocated to the first individual logical cache from the amalgamated data storage by allocating additional memory from only a first SSD of the SSDs, and to update an entry in a table to indicate the first SSD and memory portions of the first SSD allocated to the first individual logical cache, wherein the entry in the table corresponds with the first individual logical cache.

2. The server rack system of claim 1, further comprising:
a second server stored in the server rack and including a second BMC, the second BMC configured to communicate with the CMC;
a second controller stored in the server rack and associated with the second BMC, wherein the CMC is configured to partition the amalgamated data storage into a second individual logical cache associated with the second BMC.

3. The server rack system of claim 2, wherein second controller manages the second individual logical cache.

4. The server rack system of claim 2, wherein the second BMC accesses the second individual logical cache.

5. The server rack system of claim 2, wherein the second individual logical cache and the first individual logical cache are allocated different portions of the data storage provided by the set of SSDs.

6. The server rack system of claim 1, wherein the CMC increases the allocated data storage based on a performance of the first individual logical cache.

7. The server rack system of claim 2, wherein the CMC is configured to decrease data storage allocated to the first individual logical cache from the amalgamated data storage.

8. The server rack system of claim 7, wherein the CMC decreases data storage based on one or more communications from the first controller.

9. An information handling system, comprising:
a server rack including a chassis management controller (CMC);
a CMC storage accessible by the CMC;
a first server stored in the server rack and including a first baseboard management controller (BMC), the first BMC configured to communicate with the CMC;
a first controller stored in the server rack and configured to control a cache memory; and
a set of solid state devices (SSDs) stored in the server rack and in communication with the CMC, wherein the CMC is configured to amalgamate data storage provided by SSDs of the set of SSDs, partition the amalgamated data storage into a first individual logical cache associated with the first controller, and record portions of the SSDs allocated to the first individual logical cache in the CMC storage, wherein during a first increase, the CMC is configured to provide an additional amount of data storage allocated to the first individual logical cache from the amalgamated data storage by allocating additional memory from only a first SSD of the SSDs, and to update an entry in a table to indicate the first SSD and memory portions of the first SSD allocated to the first individual logical cache, wherein the entry in the table corresponds with the first individual logical cache.

10. The server rack system of claim 9, further comprising:
a second server stored in the server rack and including a second BMC, the second BMC configured to communicate with the CMC;
a second controller stored in the server rack and associated with the second BMC, wherein the CMC is configured to partition the amalgamated data storage into a second individual logical cache associated with the second BMC.

11. The server rack system of claim 10, wherein second controller manages the second individual logical cache.

12. The server rack system of claim 10, wherein the second BMC accesses the second individual logical cache.

13. The server rack system of claim 10, wherein the second individual logical cache and the first individual logical cache are allocated different portions of the data storage provided by the set of SSDs.

14. The server rack system of claim 9, wherein the CMC increases the allocated data storage based on a performance of the first individual logical cache.

15. A method performed in a server rack system, the method comprising:
amalgamating data storage provided by a plurality of solid state devices (SSD) stored in a server rack of the server rack system by a chassis management controller (CMC) of the server rack;
partitioning the amalgamated data storage into a first individual logical cache and a second individual logical cache by the CMC;
record portions of data storage of the SSDs allocated to the first individual logical cache in a CMC storage by the CMC;
providing access to the first individual logical cache to a first controller stored in the server rack;
during a first increase, providing an additional amount of data storage allocated to the first individual logical cache from the amalgamated data storage by allocating additional memory from only a first SSD of the SSDs; and
updating an entry in a table to indicate the first SSD and memory portions of the first SSD allocated to the first individual logical cache, wherein the entry in the table corresponds with the first individual logical cache.

16. The method of claim 15, wherein the second individual logical cache and the first individual logical cache are allocated different portions of the amalgamated data storage.

17. The method of claim 15, wherein the first controller is a BMC of a server stored in the server rack.

18. The method of claim 17, wherein the first controller is a RAID controller associated with a BMC of a server stored in the server rack.

* * * * *